United States Patent [19]

Tai et al.

[11] Patent Number: 5,841,976

[45] Date of Patent: *Nov. 24, 1998

[54] METHOD AND APPARATUS FOR SUPPORTING MULTIPOINT COMMUNICATIONS IN A PROTOCOL-INDEPENDENT MANNER

[75] Inventors: Tsung-Yuan Charles Tai, Portland; David B. Andersen, Hillsboro, both of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 625,799

[22] Filed: Mar. 29, 1996

[51] Int. Cl.$^6$ .................................................. G06F 11/00

[52] U.S. Cl. .............................. 395/200.34; 395/200.55; 395/200.57; 370/260; 370/261; 370/262

[58] Field of Search ......................... 395/200.01, 200.02, 395/200.04, 200.08, 200.12, 680, 681, 200.34, 200.55, 200.57; 370/260, 261, 262

[56] References Cited

U.S. PATENT DOCUMENTS

| | | | |
|---|---|---|---|
| 5,195,086 | 3/1993 | Baumgartner et al. | 370/62 |
| 5,557,725 | 9/1996 | Ansberry et al. | 395/153 |
| 5,581,702 | 12/1996 | McArdle et al. | 395/200.04 |
| 5,619,555 | 4/1997 | Fenton et al. | 379/67 |
| 5,627,978 | 5/1997 | Altom et al. | 395/330 |

OTHER PUBLICATIONS

"Windows Sockets 2 Application Programming Interface", An Interface for Transparent Network Programming Under Microsoft Windows™, Revision 2.2.0, May 10, 1996.

*Primary Examiner*—Parshotam S. Lall
*Assistant Examiner*—Saleh Najjar
*Attorney, Agent, or Firm*—Blakely, Sokoloff, Taylor & Zafman

[57] ABSTRACT

A method and apparatus for enabling a computer system to initiate, conduct, and terminate a multipoint computer conference regardless of the underlying network protocols. The computer system executes software which determines whether the network supports rooted control and rooted data. When the network supports rooted control, the computer system waits for a connect signal sent from a control leaf node of a plurality of control leaf nodes when the computer system is a control root node and the computer system is to wait for the connect signal. The receipt by the control root node of the connect signal causes the control leaf node to join the conference. The computer system sends the connect signal to the control leaf node when the computer system is the control root node and the computer system is not to wait for the connect signal. The receipt by the control leaf node of the connect signal causes the control leaf node to join the conference. The connect signal is sent from the control root node and from the control leaf node using a function call with arguments identifying the control leaf node and the control root node.

29 Claims, 2 Drawing Sheets

METHOD AND APPARATUS FOR SUPPORTING MULTIPOINT COMMUNICATIONS IN A PROTOCOL-INDEPENDENT MANNER

BACKGROUND

1. Field of the Invention

The invention relates to the field of multipoint data and video conferencing using a computer.

2. Prior Art Background

Point-To-Point and Multipoint Communications

A large amount of communications in the world today can be characterized as point-to-point communications. In point-to-point communications, two connected parties exchange information with one another. A good example of point-to-point communications is the typical telephone conversation, in which two parties exchange voice information over the telephone lines.

Although useful and extensively utilized, point-to-point communications has some limitations. One limitation is that group working environments are not supported by the point-to-point model. In group work environments, multiple parties (more than two) exchange information and solve problems as a group. An example of a group work environment is the classroom. In the classroom, an instructor disseminates information, and the class responds with feedback. Another example of a group work environment is the collaborative editing of a document on a computer network by a group of technical writers. In this case, the writers may be in different rooms, different buildings, or even different cities. The multipoint video conference is a third example of the group work environment. In the multipoint video conference, multiple parties exchange moving video images. Because the parties to the multipoint video conference are often in different cities, the conference is often carried out over telephone networks, or wide area computer networks such as the Internet.

The popularity of group work environments on computer and telephone networks has increased in recent years. The multipoint video conference, in particular, has gained greatly in popularity, mainly because it can save the participants time and money. The multipoint video conference is often used in lieu of a face-to-face meeting between the parties, which saves on the cost and time of air travel.

Programming Interfaces for Communications

The modern trend is toward using computers as a communications platform. As a consequence of this trend, programming interfaces have developed to enable computer programs on one computer to communicate with programs on another computer. These application programming interfaces (API's) are designed to shelter the programs that use them from differences in the hardware and protocols used by the underlying network.

Presently, communication between two computer processes can be implemented by utilizing a "socket" mechanism. A socket, as popularized in the Berkeley Software Distribution (BSD) of implementation of the Unix (TM) operating system, is essentially an endpoint of communication. A socket in use usually has an address logically bound to it; the nature of the address depending upon the communication domain of the socket. A characteristic property of a communication domain is that processes communicating in the same domain use the same address format. For example, Unix (TM) 4.3BSD includes a Unix (TM) domain and an Internet domain. The address format of the Unix domain comprises ordinary file-system path names, such as /alpha/beta/gamma. Processes communicating in the Internet domain, on the other hand, utilize Defense Advanced Research Projects Agency (DARPA) Internet communication protocols, such as TCP/IP (Transmission-Control-Protocol/Internet-Protocol), and Internet addresses, which consist of a 32-bit host number and a 16-bit port number. Thus, two processes within the Unix domain, such as programs or routines operating on the same computer system, can communicate between each other by establishing respective sockets in the Unix (TM) domain and a logical connection therebetween for data to pass from one to the other.

Two processes which operate on separate but inter networked computers can communicate with one another by establishing respective sockets in the Internet domain. Data can then be passed between the processes by way of the respective sockets by either connection-oriented stream-data transmission, or connectionless datagram packet transmission, depending upon the type of sockets established. In the case of stream-data transmission a connection from one socket to another across the network is established according to the Internet Protocol (TCP/IP) addressing scheme, which uniquely identifies the intended receiving socket to which the connection is established. In the case of datagram packet data transmission, each datagram is provided with the IP address of the receiving socket to enable each packet of the data to be routed through the network.

The Windows (TM) Sockets Interface, referred to as WinSock (TM), is an Application Programming Interface (API) for enabling computers which operate under the Windows (TM) operating system to implement a socket interface similar to BSD Unix (TM). The WinSock (TM) API includes a Dynamic Linked Library (DLL) which is a library of functions that enable an application to utilize TCP/IP socket communication capability by providing functions which, for example, create a socket, bind a name to the created socket, establish a connection to another socket (for a stream-data socket) or transmit data packets (for a datagram socket), together with related functions.

TABLE 2

```
2-1 s = socket (AF_INET, SOCK_DGRAM, 0);
2-2 name = &root_address;
    /* if this is the server, name the socket and listen for clients that want
    to connect to that named socket */
2-3 if(bServer) {
2-4    bind (s, name, sizeof(*name));
2-5    listen (s, SOMAXCONN) }
    /* if this is a client, send connect signal to server */
2-6 if (bClient)
2-7    connect (s, name, sizeof(*name));
```

Table 2 shows a computer program for point-to-point communications over a network, using the WinSock API V. 1.1. The program first creates a "socket descriptor" 2-1 by calling the function socket. A socket descriptor object is the software abstraction of an endpoint through which communications is performed by the program. After creating the socket descriptor 2-1, the program creates a socket name 2-2. The socket name is a unique name that identifies a communications endpoint, anywhere on the network. At line 2-3, the program checks whether it is functioning as a server or not. If the program is functioning as a server, then at line 2-4 the socket which was created in line 2-1 is given a name using the bind function. The name must uniquely identify the socket on the computer network. Client programs can connect to the server by specifying the name of the socket on the server. Once the socket is named in this manner, then the server listens for clients that want to connect. This is done at line 2-5, using the listen function.

If the program is not a server, then it is a client. A check is made at line 2-6 to determine if the program is a client. If it is, then at line 2-7 the program connects the socket to the named socket on the server using the connect function.

Improvements Needed

The WinSock API Version 1.1 does not support multipoint communications models. Although BSD Unix supports multicast through extensions to the Sockets API, these extensions are specific to the IP protocol. It would be desireable to develop API's for computer communications which include support for both point-to-point and multipoint communications. The extensions should work in a protocol-independent manner, and should support the various multipoint networking models which exist today or may come about in the future. Futhermore, the extensions should leverage the existing functionality of the point-to-point APIs to the greatest degree possible, so that programmers accustomed to point-to-point communications will feel comfortable writing and porting programs for multipoint communications.

SUMMARY OF THE INVENTION

A method and apparatus for enabling a computer system to initiate, conduct, and terminate a multipoint computer conference regardless of the underlying network protocols. The invention supports both rooted, nonrooted, and hybrid models for both control and data. Support for these models is provided by a method which simplifies the use of computers as general-purpose conferencing nodes on a network. The method is implemented on the processor of a computer system. When executed by the processor, the method causes the computer system to determine if the network supports rooted control and rooted data conferencing models. If the network supports rooted control, the method causes the computer system to wait for a connect signal sent from a control leaf node of a plurality of control leaf nodes when the computer system is a control root node and the computer system is to wait for the connect signal. Receipt by the control root node of the connect signal causes the control leaf node to join the conference. The method causes the computer system to send the connect signal to the control leaf node when the computer system is the control root node and the computer system is not to wait for the connect signal, the receipt by the control leaf node of the connect signal causing the control leaf node to join the conference. The connect signal is sent from the control root node and from the control leaf node using a function call with arguments identifying the control leaf node and the control root node.

DETAILED DESCRIPTION

In the following description, numerous specific details are set forth such as circuits, computer code, etc, in order to provide a thorough understanding of the invention. In other instances, well-known structures and techniques have not been shown in detail because to do so would unnecessarily obscure the invention. The specific arrangements and methods described herein are merely illustrative of the principles of the invention. Numerous modifications in form and detail may be made by those of ordinary skill in the art without departing from the scope of the invention. For example, variations may be made in the specific calling syntax of the various functions for multipoint conferencing without departing from the scope of the invention.

The invention is a method and apparatus for supporting multipoint/multicast communications in a conference by modelling the conference in several novel ways. In one model, one participant is designated as the control root node. The control root node is a central source of control for the conference. As a central source of control, the control root node may join the other participants to the conference. These other participants are known as control leaf nodes. For example, on a computer network the control root node of a three-party conference could connect the other two participants by sending a connection request message over the network. The other participants listen for the connection request message, and once received, they respond and become connected to the conference. This model is called rooted control. In the rooted control model, it is also possible for the leaf nodes to initiate a connection to the conference. In this case, the control root node listens for connection requests from control leaf nodes on the network. A control leaf node sends a message requesting connection to the conference; the control root node receives the message and the control leaf node is connected to the conference.

The rooted model is applicable to both control and data. In the rooted data model, one node (the data root) broadcasts data to all data leaf nodes. The data leaf nodes exchange data with the data root node, but not with each other directly. The rooted data model is often used with distance learning. In distance learning, an instructor broadcasts information to multiple students in remote locations. The instructor may be located in a special studio at a local university, and the students may be at home, scattered throughout the state or even the country. The students may interact with the instructor during the course of the conference, but the students do not interact directly with other students. Instead, students can interact directly only with the data root node (the instructor).

Another type of multipoint model is known as the non-rooted model. Like the rooted models, the non-rooted models are applicable to both control and data. In the non-rooted control model, there is no control root node. Instead, each leaf node is responsible for connecting itself to the conference. Each leaf node may drop from the conference without disrupting the conference for the other leaf nodes. In the non-rooted data model, each leaf node can communicate directly with every other leaf node.

Hybrid models are possible which combine the basic rooted and non-rooted models set forth above. For example, a conference can be rooted in control and non-rooted in data. Four combinations are possible, and are set forth in Table 1, along with real-world conferencing protocols that use each one.

TABLE 1

|  | rooted control | non-rooted control |
| --- | --- | --- |
| rooted data | ATM | no known example |
| non-rooted data | T.120 | IP Multicast |

Figure 1:
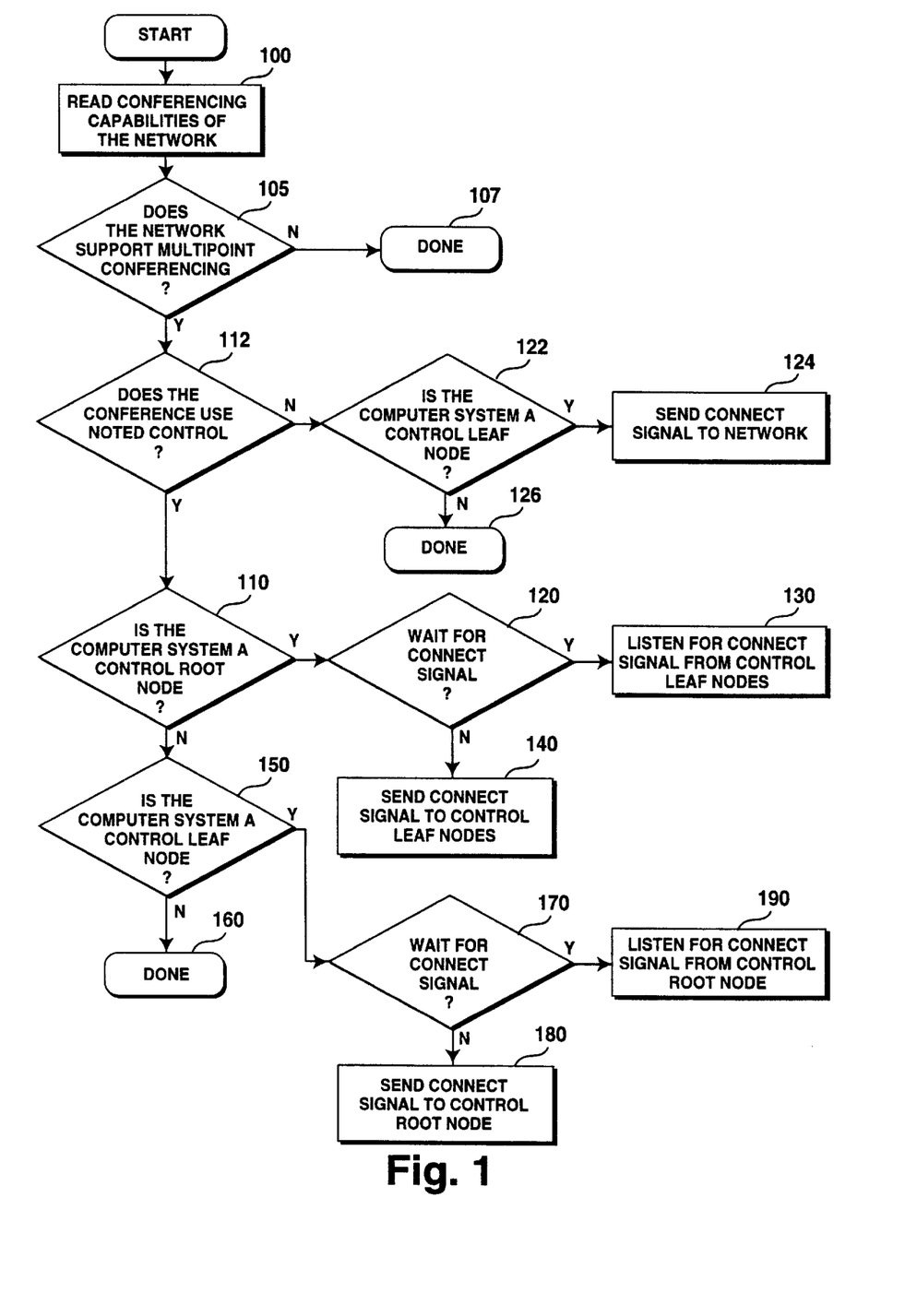
FIG. 1 shows the steps of an exemplary computer program which, when installed in a computer system, enables the computer system to function as a node in a multipoint conference.

FIG. 1 shows the steps of a method for enabling a computer system to function as a node in a multipoint conference. In one embodiment, the method is implemented using a computer program executing on the processor of a personal computer system. The conferencing capabilities of the network are read at step 100. At step 105, it is determined whether or not the conferencing capabilities for the network include support for multipoint conferencing. If multipoint conferencing is not supported, then the method concludes at step 107. Otherwise, if the network supports multipoint conferencing, then at step 112 a determination is made as to whether the conference uses rooted control. If the conference uses rooted control, at step 110 a determination is made as to whether the computer system is a control root node of the conference. This determination may be based upon input from a human user, for example the computer program may display a selection box on the screen in which the user can select, using a mouse, keyboard, or other input device, whether the computer system will be a control root or a control leaf of the conference. Or, the selection may be based upon information in a configuration file which the program reads, or the program may make the determination heuristically. If the computer system is a control root node of the conference, then a determination is made at step 120 as to whether or not to wait for a connect signal to join the conference. Similarly to the determination in step 110, this determination may be made in various ways, such as based upon user input, from a configuration file, or heuristically. If it is determined at step 120 that the computer system should wait for a connect signal to join the conference, then the method concludes at step 130 by listening for a connection signal. Otherwise, if it is determined at step 120 that the computer system should not wait for a connect signal to join the conference, the computer system at step 140 sends a connect signal to the control leaf node to join the control leaf node to the conference.

The control root node and control leaf node may be implemented using a personal computer system, a mainframe or mini-computer system, or using any type of processor-based digital computing hardware, including portable computers and hand-held devices. The control root node may also be implemented within the network itself, using telecommunications hardware such as switches, hubs, and routers.

If, at step 110, it is determined that the computer system is not a control root node of the conference, then a determination is made at step 150 as to whether or not the computer system is a control leaf node of the conference. This determination may be made in various ways, such as based upon user input, from a configuration file, heuristically. If the computer system is not a control leaf node, nor a control root node, then no conferencing is possible and the method concludes at step 160. If, however, the computer system is determined to be a control leaf node of the conference, then at step 170 a determination is made whether or not the computer system should wait for a connect signal. If the computer system should wait for a connect signal before joining to the conference, then at step 190 the computer system listens for a connect signal over the network. If however the computer system should not wait for the connect signal to join the conference, then at step 180 the computer system sends a connect signal over the network to join the conference.

If at step 112 it is determined that the conference does not use rooted control, then at step 122 a determination is made as to whether the computer system is a control leaf node of the conference. This determination is made in a manner similar to the determination at step 150. If the computer system is not a control leaf node, the method terminates 126. Otherwise, a connect signal is sent to the network at step 124 to connect the control leaf node into the conference.

In one embodiment, a human user makes the determinations about whether the computer system is to act as a control root or control leaf node, and whether or not the computer system should wait for the connection signal or send the connection signal over the network. The human user makes these determinations by selecting from a menu, dialog box, or other form of visual computer interface, using a mouse, keyboard, or other input device.

The connection signal can take on many forms, depending upon the type of network used and the protocol used for communicating on that network. For example, the connect signal can take the form of a message packet in the IP format, or it may take the form of a sequence of bytes in the User Datagram Protocol (UDP), or it may take the form of the assertion of a hardware signal. The signal may be of any type supported by the network, including signals for wireless networks.

```
        /* get protocol info */
3-2     WSAEnumProtocols (NULL, pi, sizeof(buffer));
3-4     if (!(pi->dwserviceFlags1 & XP1_SUPPORT_MULTIPOINT))
            /* multipoint conferencing not supported */
3-6         return;
        /* Create a data root socket */
3-8     iConfFlags = 0
3-10    if (pi->dwServiceFlags1 & XP1_MULTIPOINT_DATA_PLANE)
            "/* data model */".
3-12        if (bCreateDataRoot) iConfFlags |= WSA_FLAG_MULTIPOINT_D_ROOT;
            "3–13 if (bCreateDataLeaf)iConfFlags |=
            WSA_FLAG_MULTIPOINT_D_LEAF;".
3-14    if (pi->dwServiceFlags1 & XP1_MULTIPOINT_CONTROL_PLANE)
            /* rooted control supported */
3-16        if (bCreateControlRoot) iConfFlags |= WSA_FLAG_MULTIPOINT_C_ROOT;
            /* Create a data leaf socket */
3-18    if (b CreateDataLeaf) iConfFlag |= WSA_FLAG_MULTIPOINT_D_LEAF;
            /* Create a control leaf socket */
```

-continued

```
3-20  "else if (bCreateControlLeaf)". iConfFlags |= WSA_FLAG_MULTIPOINT_C_LEAF;
3-22  s = WSASocket (0,0,0,pi, iConfFlags);
      /* flags specify if the joined node will send data, receive data, or both */
3-24  if (bSendOnly) iDataFlags = JL_SENDER_ONLY;
3-26  else if (bReceiveOnly) iDataFlags = JL_RECEIVER_ONLY;
3-28  else iDataFlags = JL_BOTH;
      /* root: wait for leaf nodes to join; leaf: wait to be joined */
3-29  if (pi->dwServiceFlags1 & XP1_MULTIPOINT_CONTROL_PLANE) {
         /* rooted control supported */
3-30     if (bWaitJoin) {
3-32        if (bCreateControlRoot) name = &root_node;
3-34        else name = &leaf_node
3-36        bind (s, name, sizeof(*name));
3-38        listen (s, SOMAXCONN);
         }
3-40     else {
3-42        /* otherwise, control root joins the leaf nodes, or leaf nodes join to root */
3-44        if (bCreateControlRoot) name = &leaf_node;
3-46        else name = &root_node;
         }
      }
3-50  else {
3-52     if (bCreateControlLeaf)
3-54        name = &conference;
      }
3-56  s = WSAJoinLeaf (s, name, sizeof(*name), NULL, NULL, NULL, NULL, iDataFlags);
3-58  send (s, &data, sizeof(data), 0);
3-60  recv (s, &data, sizeof(data), 0);
```

Table 3 shows an exemplary computer program which, when installed in a computer system, enables the computer system to function as a node in a multipoint conference, using the method depicted in FIG. 1. The exemplary computer software code in Table 3 is shown in C language, which is a common programming language for programs today. However, the invention is not limited to C language, and could be implemented using any programming language, including Pascal, FORTRAN, C++, or any other programming language with support for variables and function or subroutine calls. The exemplary computer code also includes comments, which are non-functional statements placed within the code for the purposes of documentation. The comments are text strings located between the character sequences "/*" (forward slash, star) and "*/" (star, forward slash). The comments are not required by the program, and could be entirely excised from the computer code without affecting the function of the program. For a complete description of the functions and flags used within the program in Table 3, refer to the Windows Sockets 2 Application Programming Interface Specification, available from the Intel™ Corporation.

Table 3 shows how a computer program can determine whether the network to which it is connected supports multipoint conferencing, and if so, what multipoint capabilities are supported by the network. This can be accomplished by querying the underlying software layers to determine which multipoint capabilities are supported by the network, if any. At line 3-2, a call is made to function WSAEnumProtocols. A buffer variable pi is passed as an argument to the function, along with an argument indicating the size of the buffer. The function returns, in the buffer pi, information about the protocols and capabilities supported by the underlying software layers. The buffer pi contains a bitfield dwServiceFlags1, which is comprised of flags indicating the features and capabilities of the network. At line 3-4, the bitfield dwServiceFlags1 is checked for the flag XP1_SUPPORT_MULTIPOINT. If this flag is set, then the network supports multipoint conferencing. If it is not set, then at line 3-6 the program terminates because the network does not support multipoint conferencing.

At line 3-8, a variable iConfFlags containing flags that control the behavior of the program is initialized to zero. At line 3-10, the bitfield dwServiceFlags1 is checked for the flag XP1_MULTIPOINT_DATA_PLANE. If this flag is set, then the network supports the rooted data model. If the network supports rooted data and the computer system running the program will function as a data root node, then at line 3-12 a bit identified by WSA_FLAG_MULTIPOINT_D_ROOT is set within the iConfFlags variable. At line 3-14, the bitfield dwServiceFlags1 is checked for the flag XP1_MULTIPOINT_CONTROL_PLANE. If this flag is set, then the network supports the rooted control model. If the network supports rooted control and the computer system running the program will function as a control root node, then at line 3-16 a bit identified by WSA_FLAG_MULTIPOINT_C_ROOT is set within the iConfFlags variable. Of course, the names of the functions, flags, variables, and fields may change without altering the scope of the invention.

If the computer system running the program will function as a data leaf node, then at line 3-13 a bit identified by WSA_FLAG_MULTIPOINT_D_LEAF is set within the iConfFlags variable. If the computer system running the program will function as a control leaf node, then at line 3-20 a bit identified by WSA_FLAG_MULTIPOINT_C_LEAF is set within the iConfFlags variable. The flags WSA_FLAG_MULTIPOINT_D_ROOT, WSA_FLAG_MULTIPOINT_D_LEAF, WSA_FLAG_MULTIPOINT_C_ROOT, WSA_FLAG_MULTIPOINT_C_LEAF are each distinct from one another. The flags WSA_FLAG_MULTIPOINT_D_ROOT and WSA_FLAG_MULTIPOINT_D_LEAF are mutually exclusive of one another, as are the flags WSA_FLAG_MULTIPOINT_C_ROOT and WSA_FLAG_MULTIPOINT_C_LEAF. More than one flag may be set at once, so that the hybrid models of Table 1 are represented by setting multiple bits in the flags variable. For example, the rooted data/ rooted control hybrid model can be represented by setting both of the bits WSA_FLAG_MULTIPOINT_D_ROOT and WSA_FLAG_MULTIPOINT_C_ROOT.

At line 3-22, a socket descriptor object identified by variable s is created to act as a communication endpoint between the program and the conference. In one embodiment, the socket descriptor object is created by calling a function WSASocket. One skilled in the art will appreciate that other names for the function are possible without departing from the scope of the invention. The WSASocket function accepts an argument, pi, which identifies the protocol to use for the conference. The WSASocket function also accepts an argument, iConfFlags, which is the bit-field of flags which identify the conferencing model to use, set in lines 3-10 through 3-20. The socket descriptor object s created by WSASocket functions according to the specified conferencing model and the specified protocol.

If the socket descriptor object is used only to send data, then at line 3-24 the flags variable iDataFlags is set to JL_SENDER_ONLY. If the socket descriptor object is used only to receive data, then at line 3-26 the flags variable is set to JL_RECEIVER_ONLY. If the socket descriptor object is used to both send and receive data, then at line 3-28 the flags variable is set to JL_BOTH.

At line 3-30, the program checks whether or not it is configured to wait for a connection signal from another node in the conference. If the program is configured to wait for a connection signal, then at line 3-32 the program checks whether or not it is a control root of the conference. If the program is the control root of the conference, then the name of the root socket descriptor object is selected for the socket descriptor object. This is done so that leaf nodes can identify the control root by name when sending a connect signal to the root node. If the program is not the control root of the conference (i.e. it is a control leaf), then at line 3-34 the name of the leaf socket descriptor object is selected for the name of the socket descriptor object. This is done so that the control-root node of the conference can identify the leaf by name when sending a connection signal to the leaf node.

At line 3-36, the name for the socket descriptor object which was selected in lines 3-32 or 3-34 is assigned to the socket descriptor object, using the bind function. At line 3-38, the program waits (listens) for a connect request from another node, using the listen function. If the program is the control root of the conference, the connect signal will come from a control leaf node, or from network equipment which intervenes between the control root node and the control leaf nodes. If the program is a control leaf of the conference, then the connect signal will come from the control root node of the conference, or from the network equipment. One skilled in the art will appreciate that in this and all other lines of the program, the names syntax of particular functions may be changed from the exemplary names and syntaxes set forth in the figure, without departing from the scope of the invention.

At line 3-40 of the program, alternate instructions are selected for execution when the program is not configured to wait for another node to initiate connection to the conference. In this case, the program must send a connect signal to other nodes in the conference, or to intervening network equipment. Either the control-root node sends a connect signal to a leaf node of the conference, or else a control-leaf node sends a connect signal to the control root to be connected to the conference. If the program is a control-root node, then at line 3-44 the name of the node to send the connect signal to is set to the name of the leaf node. Otherwise, at line 3-46, the name of the node to send the connect signal to is set to the name of the control-root node. At line 3-56, the name of the socket descriptor object selected in lines 3-44 and 3-46 is used in a call to the function WSAJoinLeaf. Function WSAJoinLeaf sends a connect signal between the socket descriptor object identified by variable s with the node containing the socket descriptor object identified by the name variable. The iDataFlags variable is also passed as an argument to WSAJoinLeaf, to indicate whether the connected node should be able to send data, receive data, or both. If the name of the node was assigned the name of the leaf node socket descriptor object, then the control root node sends a connect signal to the leaf node. If the name of the node was assigned the name of the control root socket descriptor object, then the leaf node sends a connect signal to the control root to connect itself to the conference. Note that the control root may be implemented using a personal computer system, or may be part of the conferencing network equipment, or both.

When the network does not support rooted control, there can be no explicit control-root node. In this case, each leaf node wishing to connect to the conference can set the name variable in WSAJoinLeaf to a name which identifies a multipoint conference. In the non-rooted control model, the control root of the conference is implicit in the network itself, and so an identification of this implicit control root is sufficient for a leaf node to connect into a conference, even when it is the first leaf node in the conference to do so. In Table 3, at line 3-50, alternate instructions are set when the network does not support rooted control. At line 3-52, if the computer system running the program will act as a control leaf in the conference, then at line 3-54 a name identifying the conference is assigned to the control leaf and at line 3-56 a connect signal is sent to the network using WSAJoinLeaf to join the system to the conference.

No special processing is required by the program to implement multicasting of data. Rather, a single function call can be used to multicast data, for example, the send( ) function as shown in Table 3, line 3-58. For example, if the program creates a data root socket descriptor object by setting the WSA_FLAG_MULTIPOINT_D_ROOT flag and calling the WSASocket function, the call to send( ) in line 3-58 will multicast any data transmitted through the created socket to all leaf nodes in the conference. Likewise, using a single function call, data may be received from any one of the leaf nodes of the conference by way of the data root socket. In Table 3, the recv( ) function is used at line 3-60. Using the same single function call, data leaf nodes in the rooted data conference may send data to the data root node (but not to other leaf nodes). In a non-rooted data conference, data sent by way of any leaf socket descriptor object is multicast to all other leaf nodes in the conference, again using the same single function call.

The method of FIG. 1 offers several advantages for multipoint communications. First, as shown by the exemplary computer program of Table 3, all of the multipoint models of Table 1 are supported with a minimum of variable and name-space overhead in the program. Second, the program functions independently of the network protocol implementation. Third, the program uses functions which are familiar in the point-to-point communications model; specifically, the function to create a socket descriptor object, the function to bind a name to a socket descriptor object, and the function to listen for connection requests. Conferences for all of the multipoint communications models can be built with the addition of a single new function, which in the exemplary computer program of Table 3 is called WSA-JoinLeaf. In addition, the highly unified interface for sending and receiving data simplifies the design requirements of data and video conferencing programs. A single function call can be used to send multicast data from both root and leaf nodes. The same single function call can be used to send data point-to-point (for example, from a leaf node to the data root node). Likewise, single function call can be used to receive multicast data from both root and leaf nodes, or to receive data in a point-to-point manner.

A program is not required to query the lower software levels for the multipoint capabilities of the network. A program could participate in a multipoint conference without first retrieving the capabilities of the network. However, such a program would be less flexible and more prone to errors, because it would not be able to adapt itself to the capabilities of the underlying network.

Figure 2:
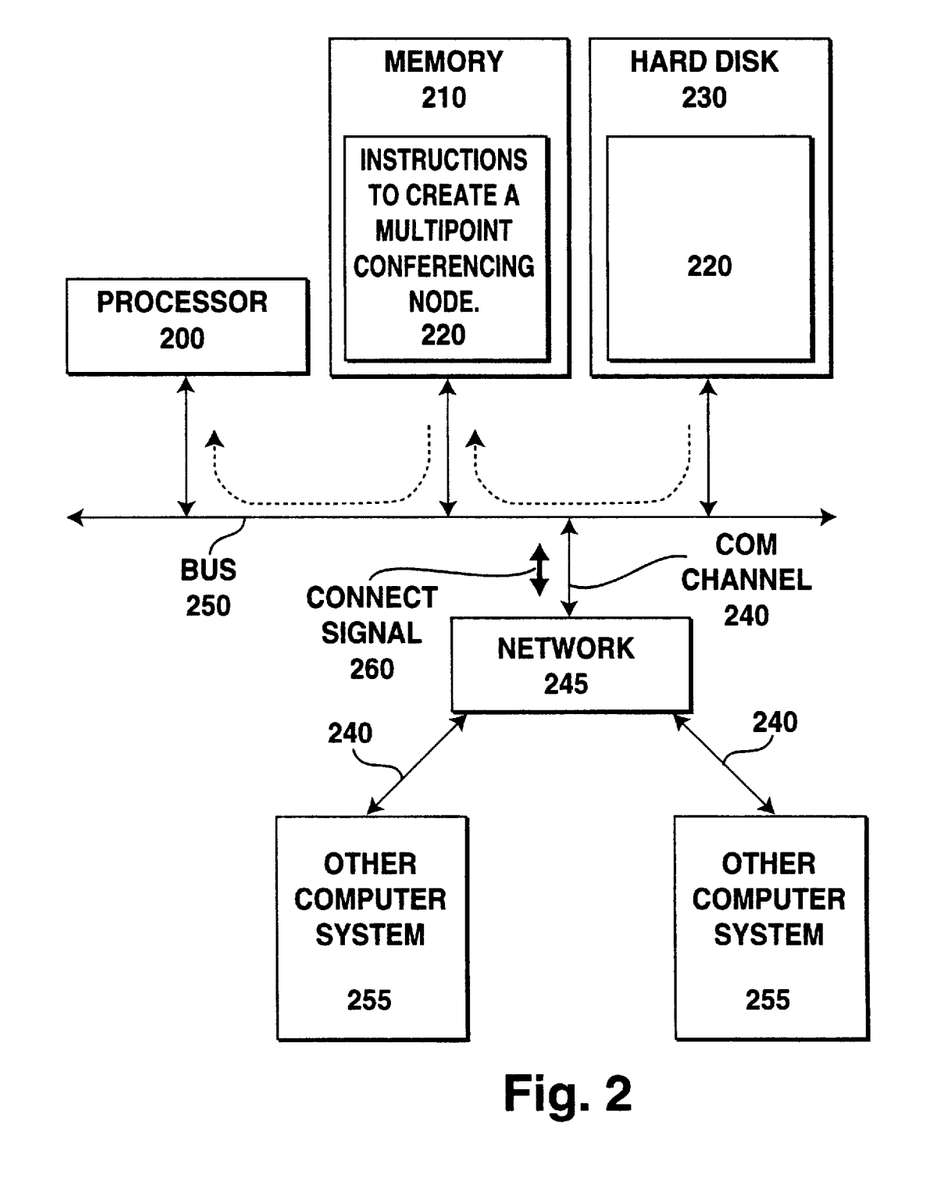
FIG. 2 shows a computer system in which the method of FIG. 1 may be implemented to cause the computer system to function as a node in a multipoint conference.

FIG. 2 shows a first computer system 205 in which the method of FIG. 1 may be implemented to cause the first computer system 205 to function as a node in a multipoint conference. The first computer system 205 and other computer systems 255 are shown connected to a communications network 245 by way of communication channels 240. The first computer system comprises a processor 200 for executing the computer instructions to create a multipoint conferencing node 220. The computer instructions to create a multipoint conferencing node 220 implement the method of FIG. 1. The processor 200 may include registers for storing data, instructions and pointers for managing execution of the computer instructions to create a multipoint conferencing node 220. The processor 200 may also include status registers, and address registers for storing the addresses of instructions and data. The computer instructions to create a multipoint conferencing node 220 is typically stored in a memory 210 such as a Random Access Memory (RAM), or stored on a mass storage device 230. The memory 210 may also be a cache memory, a Read-Only-Memory (ROM), a flash memory, or any other form of memory device which is capable of storing instructions which are executed by a computer processor 200. The computer instructions to create a multipoint conferencing node 220 are typically loaded into memory 210 from permanent storage device 230 and then supplied to the processor 200 over a bus 250. In this example, the memory 210 and the processor 200 are shown as separate elements, however, one skilled in the art will readily appreciate that the memory 210 and the processor 200 may be combined into a single integrated device, such as with on-chip cache memories. In addition to storing instructions for execution on the processor, memory 210 may also store data to use with those instructions, as well as temporary variables and other intermediate information resulting from execution of those instructions. One skilled in the art will also appreciate that bus 250 may be implemented in numerous ways, for example, using an electrically conductive material, or using optical coupling.

The mass storage device 230 provides permanent storage in the computer system for large amounts of information.. It may be implemented in numerous ways, for example using a magnetic disk, optical disk, or streaming tape.

The computer system of FIG. 2 also includes a communications channel 240 by which the first computer system 205 and other computer systems 255 communicate with the network 245. The network may be a telephone network, a computer network such as a Local Area Network or the Internet, or even to a remote satelite system. As a multipoint conference is established, the first computer system 205 will exchange connect signals 260 with the other computer systems 255 on the network 245, or with the network 245 itself (for non-rooted control models). The first computer system 205 will send connect signals 260, receive connect signals 260, or both, depending upon whether the computer instructions to create a multipoint conferencing node 220 are configured to listen for or send connect signals 260. The computer instructions to create a multipoint conferencing node 220 may query the underlying software for the multipoint capabilities of the network, although they are not required to do so in order to carry out the method of the invention.

Although this invention has been shown in relation to a particular embodiment, it should not be considered so limited. Rather, the invention is limited only by the scope of the appended claims.

What is claimed is:

1. A computer-readable medium having stored thereon a plurality of instructions which, when executed by a processor in a computer system, cause the processor to perform the steps of:

determining whether a network for a conference supports rooted control and rooted data;

if the network supports rooted control, determining whether the computer system is a control root node based on an input entry;

responding to a condition where the network supports rooted control and the computer system is a control root node by:

waiting for a connect signal requesting a connection to the conference from a control leaf node of a plurality of control leaf nodes to the control root node while the control root node is to wait for the connect signal, a receipt by the control root node of the connect signal causing the control leaf node to join the conference; and sending the connect signal to the control leaf node when the control root node is not to wait for the connect signal, the receipt by the control leaf node of the connect signal causing the control leaf node to join the conference;

wherein the connect signal is sent from the control root node and from the control leaf node using a function for joining nodes with arguments identifying the control leaf node and the control root node.

2. The computer-readable medium of claim 1 in which the plurality of instructions cause the processor to perform the additional step of using the function for joining nodes to send the connect signal to the network when the computer system is the control leaf node and the network does not support rooted control, the receipt by the network of the connect signal causing the control leaf node to join the conference.

3. The computer-readable medium of claim 1 in which the plurality of instructions cause the processor to perform the additional step of using the function for joining nodes to specify whether the control leaf node is to send data, receive data, or both.

4. The computer-readable medium of claim 1 in which the control root node waiting for the connect signal from the control leaf node does not preclude the control root node from sending the connect signal to the control leaf node to join the control leaf node to the conference.

5. The computer-readable medium of claim 1 in which the plurality of instructions cause the processor to perform the additional step of sending data from the control root node to the plurality of control leaf nodes using a single function call for sending data.

6. The computer-readable medium of claim 1 in which the plurality of instructions cause the processor to perform the additional step of receiving data by the control root node from any one of the plurality of control leaf nodes using a single function call for receiving data.

7. A method for joining a computer system to a multipoint computer conference, the method comprising the computer-implemented steps of:

determining whether a network for the conference supports rooted control and rooted data;

if the network supports rooted control, determining whether the computer system is a control root node based on an input entry;

responding to a condition where the network supports rooted control and the computer system is a control root node by:

waiting for a connect signal requesting a connection to the conference from a control leaf node of a plurality of control leaf nodes to the control root node while the control root node is to wait for the connect signal, a receipt by the control root node of the connect signal causing the control leaf node to join the conference; and     sending the connect signal to the control leaf node when the control root node is not to wait for the connect signal, the receipt by the control leaf node of the connect signal causing the control leaf node to join the conference;

wherein the connect signal is sent from the control root node and from the control leaf node using a function for joining nodes with arguments identifying the control leaf node and the control root node.

8. The method of claim 7 comprising the additional computer-implemented step of using the function for joining nodes to specify whether the control leaf node is to send data, receive data, or both.

9. The method of claim 7 comprising the additional computer-implemented step of using the function for joining nodes to send the connect signal to the network when the computer system is the control leaf node and the network does not support rooted control, the receipt by the network of the connect signal causing the control leaf node to join the conference.

10. The method of claim 7 in which the control root node waiting for the connect signal from the control leaf node does not preclude the control root node from sending the connect signal to the control leaf node to join the control leaf node to the conference.

11. The method of claim 7 comprising the additional computer-implemented step of sending data from the control root node to the plurality of control leaf nodes using a single function call for sending data.

12. The method of claim 7 in which the plurality of instructions cause the processor to perform the additional step of receiving data by the control root node from any one of the plurality of control leaf nodes using a single function call for receiving data.

13. A computer-readable medium having stored thereon a plurality of instructions which, when executed by a processing means in a computer system, cause the processing means to perform the steps of:

determining whether a network for a conference supports rooted control and rooted data;

if the network supports rooted control, determining whether the computer system is a control root node based on an input entry;

responding to a condition where the network supports rooted control and the computer system is a control root node by:

waiting for a connect signal requesting a connection to the conference from a control leaf node of a plurality of control leaf nodes to the control root node while the control root node is to wait for the connect signal, a receipt by the control root node of the connect signal causing the control leaf node to join the conference; and         sending the connect signal to the control leaf node when the control root node is not to wait for the connect signal, the receipt by the control leaf node of the connect signal causing the control leaf node to join the conference.

14. The computer-readable medium of claim 13 in which the plurality of instructions cause the processing means to perform the additional step of sending the connection signalling means to the networking means when the computer system is the control leaf means and the networking means does not support rooted control, the receipt by the networking means of the connection signalling means causing the control leaf means to join the conference.

15. The computer-readable medium of claim 13 in which the plurality of instructions cause the processing means to perform the additional step of specifying whether the control leaf means is to send data, receive data, or both.

16. The computer-readable medium of claim 13 in which the control root means waiting for the connection signalling means from the control leaf means does not preclude the control root means from sending the connection signalling means to the control leaf means to join the control leaf means to the conference.

17. The computer-readable medium of claim 13 in which the plurality of instructions cause the processing means to perform the additional step of sending data from the control root means to the plurality of control leaf means using a data sending means.

18. The computer-readable medium of claim 13 in which the plurality of instructions cause the processing means to perform the additional step of receiving data by the control root means from any one of the plurality of control leaf nodes using a data receiving means.

19. A computer system comprising:

a bus;

a processor coupled to the bus; and a memory coupled to the bus, the memory having stored thereon a plurality of instructions which, when executed by the processor, cause the processor to perform the steps of:

determining whether a network for a conference supports rooted control and rooted data;

if the network supports rooted control, determining whether the computer system is a control root node based on an input entry;

responding to a condition where the network supports rooted control and the computer system is a control root node by:

waiting for a connect signal requesting a connection to the conference from a control leaf node of a plurality of control leaf nodes to the control root node while the control root node is to wait for the connect signal, a receipt by the control root node of the connect signal causing the control leaf node to join the conference, and         sending the connect signal to the control leaf node when the control root node is not to wait for the connect signal, the receipt by the control leaf node of the connect signal causing the control leaf node to join the conference,     wherein the connect signal is sent from the control root node and from the control leaf node using a function for joining nodes with arguments identifying the control leaf node and the control root node.

20. The computer system of claim 19 in which the plurality of instructions cause the processor to perform the additional step of using the function for joining nodes to send the connect signal to the network when the computer system is the control leaf node and the network does not support rooted control, the receipt by the network of the connect signal causing the control leaf node to join the conference.

21. The computer system of claim 19 in which the plurality of instructions cause the processor to perform the additional step of using the function for joining nodes to specify whether the control leaf node is to send data, receive data, or both.

22. The computer system of claim 19 in which the control root node waiting for the connect signal from the control leaf node does not preclude the control root node from sending the connect signal to the control leaf node to join the control leaf node to the conference.

23. The computer-readable medium of claim 19 in which the plurality of instructions cause the processor to perform the additional step of sending data from the control root node to the plurality of control leaf nodes using a single function call for sending data.

24. The computer-readable medium of claim 19 in which the plurality of instructions cause the processor to perform the additional step of receiving data by the control root node from any one of the plurality of control leaf nodes using a single function call for receiving data.

25. A conferencing system comprising:
 a first computer;
 a network that supports rooted control;
 a second computer comprising a control root node of a conference involving the first and second computers, the second computer coupled to the first computer by way of the network, the network determining whether the second computer is the control root node based on an input entry, the second computer waiting for a connect signal requesting a connection to the conference from the first computer to the second computer when the second computer is configured to wait for the connect signal, a receipt by the second computer of the connect signal causing the first computer to join the conference, the second computer sending the connect signal to the first computer when the second computer is not configured to wait for the connect signal, the receipt by the first computer of the connect signal causing the first computer to join the conference;
 wherein the connect signal is sent from the first computer or from the second computer using a function for joining computers to the conference, the function comprising arguments identifying the first computer and the second computer.

26. The conferencing system of claim 25 in which the function for joining computers to the conference further comprises at least one argument specifying whether the first computer is to send data, receive data, or both.

27. The conferencing system of claim 25 in which the second computer waiting for the connect signal from the first computer does not preclude the second computer from sending the connect signal to the first computer to join the first computer to the conference.

28. The conferencing system of claim 25 further comprising a third computer coupled to the first and second computers by way of the network, the second computer sending data to the first computer and the third computer at the same time using a single function call for sending data when the network supports rooted data.

29. The computer system of claim 28 in which the second computer receives data from the first or third computers using a single call for receiving data.

* * * * *